United States Patent Office 3,167,791
Patented Feb. 2, 1965

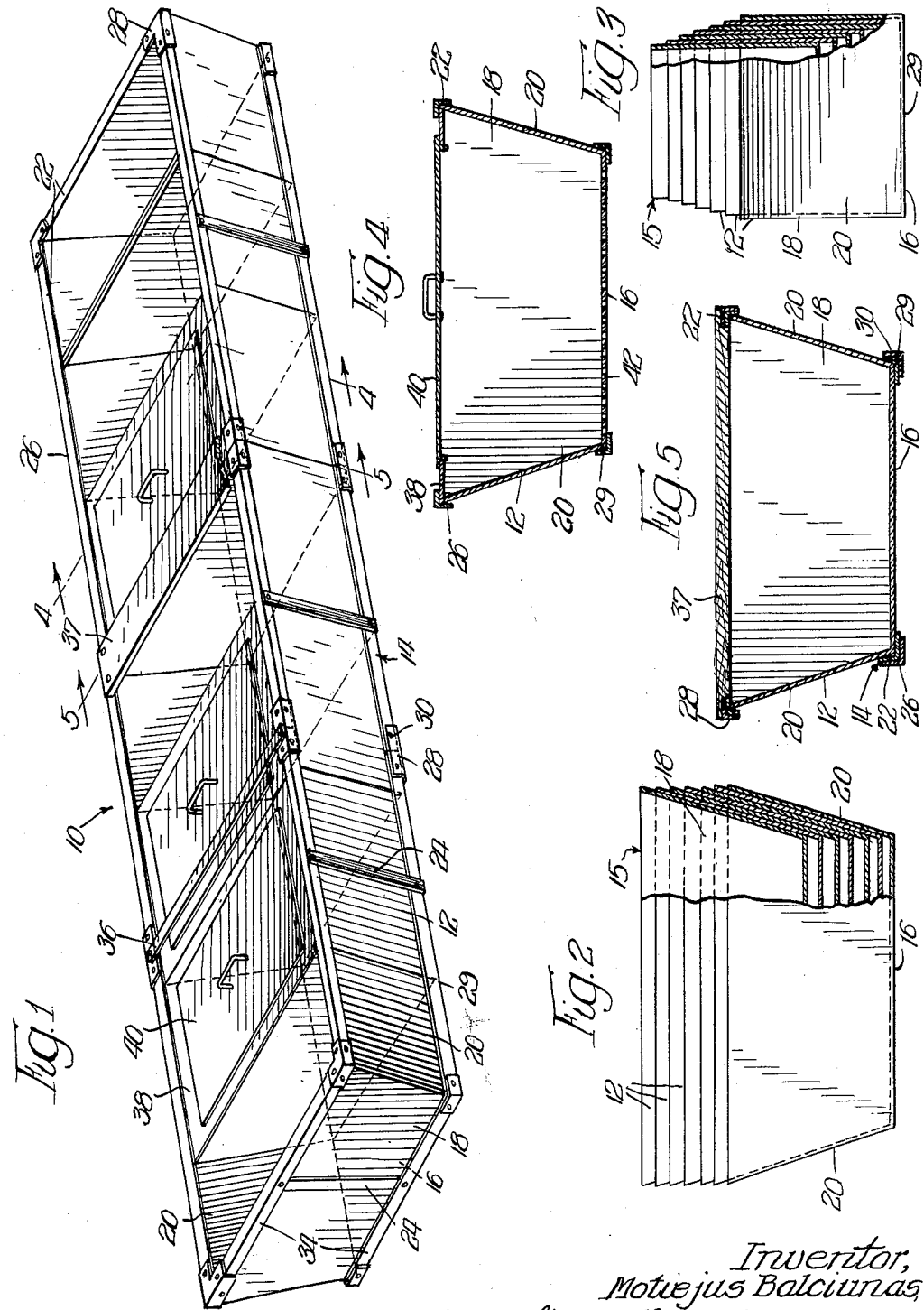

3,167,791
MODULE BOAT
Motiejus Balciunas, 1825 S. May St., Chicago, Ill.
Filed July 30, 1964, Ser. No. 386,238
1 Claim. (Cl. 9—2)

The present invention relates to floatation devices and more particularly to transportable boats employing modular components.

It is an object of the invention to provide a novel floatation structure comprising a plurality of separable and independent floatation compartments.

It is another object of the invention to provide a rigid unitary boat which may be readily assembled from a number of separable floatation compartments.

It is a further object of the invention to provide a strong and safe but lightweight boat which may be carried in a very compact disassembled form and which is rapidly and easily assembled.

It is a specific object of the invention to provide a novel boat comprising a group of abutting lightweight modular floatation compartments which are joined together to form a unitary boat structure by means of an external framework structure contacting and enclosing the group of modules.

Further objects and advantages of the present invention will be apparent from the following description and drawings, wherein:

FIGURE 1 is a perspective view of a module boat in accordance with the present invention;

FIGURE 2 is a front elevational view, partially in cross-section, of the modules shown in FIGURE 1 stacked into a transportable nest;

FIGURE 3 is a side elevational view, partially in cross-section, of the nest shown in FIGURE 2;

FIGURE 4 is a front cross-sectional view taken along the lines 4—4 of FIGURE 1; and FIGURE 5 is a front cross-sectional view taken along the lines 5—5 of FIGURE 1.

Referring to the drawings, FIGURES 1-5, there is shown therein one embodiment 10 of a module boat in accordance with the present invention. The module boat 10 comprises a plurality of separable floatation compartments or modules 12, joined together by an external framework 14 which serves to both secure the modules 12 together in an integral structure and also provides structural strength for the complete boat, as will be described herein. The modules 12 preferably each differ slightly in dimension so as to be adapted to be stacked into a compact transportable nest 15 as shown in FIGURES 2 and 3, yet rapidly assembled into the boat 10. The term "boat" herein is intended to encompass a boat, raft, barge, float, pontoon, or any other water-borne craft.

Describing the structure of the module boat 10 in further detail, each module 12 of the module boat 10 is preferably a lightweight, thin-walled rectilinear watertight floatation vessel having a bottom 16, two parallel opposing and vertical end walls 18, and two opposing outwardly sloping side walls 20. Each side wall 20 preferably forms an obtuse interior angle with the bottom 16, the intersecting surfaces forming an angular extremity 29 along the bottom of the module at each side.

To allow the separate modules 12 to readily stack one inside the other to form a compact nest 15 which is only slightly larger than the largest single module, the following described module configuration is preferably employed. First, as to width, because the side walls 20 preferably have an outward slope, the modules will all stack in this dimension, (i.e., since the side walls slope outwards, the interior width within each module increases from the bottom to the top of each module thereby automatically providing spacing, as shown in FIGURE 2). Thus, all the modules may have the same width and the same degree of slope on the side walls.

As to length, the end walls 18 of each module, as described above, are preferably in a vertical parallel spaced configuration, perpendicular to the bottom 16. Thus the interior distance between end walls (the length of the module) is constant. Therefore each module must differ in length in order to allow for stacking. That is, the distance between the end walls 18 should increase or decrease consecutively with each module.

The exemplary module boat 10 includes seven modules. As an example of the dimensions which may be employed for these modules, all of the modules may have the same bottom width of 30 inches, the same top width of 34 inches, and the same heighth of 14 inches. However, the following module lengths are then provided: 15 inches, 16 inches, 18 inches, 19 inches, 20 inches, 21 inches, and 22 inches.

It will be noted from the above description that the dimensions of the modules preferably vary only in one axis—lengthwise. Thus when the modules are unstacked and assembled evenly in line lengthwise, end wall to end wall, the assembled group of modules will have the external configuration of a unitary structure having planar sides, a planar bottom surface, and continuous lines. For the module configuration shown, the angular extremities 29 form two continuous linear longitudinal bottom lines and similarly the top edges of the sides 20 form two linear longitudinal top lines.

Preferably the modules 12 are constructed from reasonably strong but lightweight material such as aluminum, sheet steel, fiberglass, plywood, plastic, etc. These materials may be formed to the desired shape by bending, pressing, molding, or any other suitable means of manufacturing. Thin-walled construction is preferred, as this enables closer stacking of the modules and therefore an overall smaller nest of modules. The bottom and the walls of the module may be of a very thin and lightweight construction because, as will be described herein, they are not required to sustain either significant external load forces or stresses at fastening points, unlike conventional boat structures. The various intersections of the walls and the bottom are preferably integral bends or watertight seams sealed by cement, solder, welding, or other suitable fastening arrangements so that the module forms a completely watertight, self-buoyant compartment having a freeboard substantially that of the height of its walls.

The external framework 14 of the invention is a novel structural arrangement which both secures together the separable modules and also provides the structural strength for the complete boat. In addition to providing for the transmission of load forces acting upon the boat, portions of the framework 14 serve as bumpers to absorb blows to the sides or bottom of the boat. The principal portions of the framework 14 are preferably formed by channel members 22, which have a high strength to weight ratio and provide good rigidity due to their structural configuration. The channel members 22 shown in the drawings are conventional right angle channel members, although various other configurations may be employed. The framework 14 also preferably includes connecting members 24, channel connectors 28, braces 36, and other appropriate members all in sufficiently short lengths for convenient transportation with the nest 15 of modules.

The channel members 22 are particularly suited for placing over the angular extremities of the module boat, as the channel members themselves have angular intersecting surfaces. Thus, as may be particularly seen in FIGURES 4 and 5, the channel members 22 abut or bear against the intersecting surfaces of the modules at the angular extremities along which they are placed, providing both horizontal and vertical retention of the modules without any connection or fastening to the modules.

Longitudinal channels 26 are preferably provided which extend longitudinally the full length of the boat, constructed from the channel members 22. Both maximum strength and securing of the modules is accomplished by placing these longitudinal channels in contact with the outer extremities of the boat (i.e., along the top lines and the bottom lines of the boat). For the module boat configuration herein, there are two longitudinal top edges and two longitudinal bottom edges and therefore preferably four longitudinal channels 26.

The longitudinal channels 26 are preferably formed by fastening a plurality of channel members 22 in line to one another. For the embodiment herein each longitudinal channel 26 is formed by three channel members 22. By way of example of means by which this may be accomplished, channel connectors 28, having essentially the same configuration as the channel members 22, may be placed over the abutting ends of two channel members 22 and fastened by stud bolts 30 secured to and projecting out from the channel members. The stud bolts extend through holes in the channel connector 28 so that nuts or fasteners can be threaded over the projecting ends of the bolts and secure the channel connector over the channel members, thereby securing the two channel members together. Any number of other suitable fasteners, clamps, or connecting means may be employed to rigidly fasten the channel members 22 in line to one another. Further, the channel members 22 need not necessarily abut one another, but may overlap or telescope. The length of the module boat 10 may be readily changed by altering the number of modules and the length of the longitudinal channels.

Once the longitudinal channels 26 are assembled and placed along the longitudinal lines of the boat outline formed by the assembled group of modules they are interconnected to one another to form the complete external framework 14. This is preferably accomplished in part by utilizing additional channel members 22 as transverse channels 34 placed transversely across each end of the boat along the top and bottom edges of the outermost end wall 18. Preferably the channel members 22 are provided in lengths such that one is equal to the top width of the boat and one to the bottom width, so that only two are needed at each end of the boat (i.e., each transverse channel 34 being a single channel member 22). As may be seen in FIGURE 1, one transverse channel 34 longitudinally interconnects the pair of longitudinal channels 26 along the top lines to the boat, and the other transverse channel interconnects with the pair of longitudinal channels along the bottom lines of the boat. Thus, the top edges and the bottom edges of the group of modules forming the boat are completely enclosed by channel members.

Braces 36, one being shown in FIGURE 1, may be placed across the top or bottom of the boat and secured to the longitudinal channels at each side. The brace 36 serves a function similar to that of the transverse channels 34 in horizontally interconnecting the longitudinal channels, providing further strength and pulling the top pair of longitudinal channels 26 firmly against the modules at the areas of contact. The function of the braces 36 may be served by seats 37 connected in the same manner.

To complete the framework 14 the longitudinal channels 26 and the transverse channels 34, bearing against and enclosing the top edges of the boat, must be secured to the channels around the bottom edges of the boat by vertically connecting members 24. Various locations may be used for the connecting members 24. As shown, they are centrally placed at the ends of the boat, vertically interconnecting the transverse channels 34 and also are located at spaced locations along the sides of the boat vertically interconnecting the longitudinal channels 26.

The connecting members 24 may be flat strips, bars, or any other suitable configuration and may be employed in any desired number and at various angles. If desired, channel members may be used as connecting members abutting the vertical corner lines of the boat. The manner of securing the ends of the connecting members 24, the transverse channels 34, and the braces 36 and seats 37 may be by any suitable fastening arrangement such as that described above in the construction of the longitudinal channels 12.

As may be seen from the drawings, the cross-sectional area and width of the channel members and other framework elements may be quite small in proportion to the dimensions of the modules providing the framework elements are of sufficiently strong material, such as aluminum, steel, fiberglass, etc. Construction of the various framework components from the above materials may be any convenient means, such as cutting, bending, welding, extruding, etc.

When the framework elements are securely interconnected to one another, a complete closed external framework 14 is formed which rigidly envelops and holds all of the modules tightly against one another and against the framework 14. The lengths of the longitudinal channels, transverse channels, braces, and connecting members are such that the framework elements simultaneously bear against, or are closely spaced from, the extremities of each module. This forms a rigid structure, yet one which does not require any actual fastening of the framework elements to the modules or the modules to one another. The modules are in effect "locked in" between the framework elements so that they cannot move with respect to one another or the framework. The usual problem of the creation of stress concentrations at fastening points is eliminated, thereby providing a much stronger structure; one which is much more resistant to fatigue failure and which does not require reinforcing at the fastening points or thick wall construction. Forces normally transmitted through the walls of a conventional boat, as for example where the ends of the boat are lifted by waves, require the conventional boat hull to be built to withstand beam stresses. In the boat 10 such external forces are transmitted from each region of the boat directly into the framework structure in that region and transmitted through the framework structure evenly to each of the other modules by means of the abutting contacts of the channel members with each module. Thus the only forces acting upon the walls of the boat (the module walls) are those due principally to the buoyancy forces exerted on each module by its displacement. As the principal framework elements are at the outer extremities of the boat, where maximum strain occurs, they in effect form a box girder providing the maximum possible rigidity.

Although not essential, it is preferred to close the open tops of some of the modules 12 so as to form substantially sealed compartments. This provides further floatation safety and an enclosed storage compartment. The covering may be accomplished by a simple flat cover 38 having substantially the same dimensions as the upper edges of the module, so that the outer edges of the cover 38 fit substantially flush within the top edges of the module. A rubber molding or gasket may be placed around the outer edges of the cover 38 to provide a watertight fit and aid in the seating of the cover. As may be seen in FIGURE 4, no fastening means are necessary to secure the cover within the module because of the slope of the side walls 20 and the fact that the channel members 22 abutting the top edges of the module also partially extend over, abut, and hold down the outer edges of the cover 38 over the open top of the modules 12.

If desired, the covers 38 may be provided with removable panels 40 therein. The panels 40 preferably comprise most of the area of the covers 38, excluding the outer edges. This allows the module 12 to be substantially open with the panel 40 removed even though the cover 38 is in place and secured by the framework 14. The panels 40 may be adapted to simply lift out of the cover 38 and may serve as seats.

The operation of the module boat 10 is characterized by easy portability and rapid assembly and disassembly, yet with high buoyancy, strength, and safety of operation. It is intended to be transported in its compact form to where it is to be placed in the water and there quickly assembled. All of the modules 12 for a module boat 10 of the dimensions described above may be transported as a compact nest 15 which together with all of the framework members may be carried, for example, in the trunk of an automobile and may be assembled by one person.

To assemble the complete boat 10 the modules 12 are unstacked and placed in line, with the end wall 18 of each module directly and evenly abutting the end wall 18 of the adjacent module. The bow and stern modules are placed accordingly. Then the channel members 22 are placed around the outside edges of the assembled line of modules; and, together with the other framework components, they are fastened together as previously described to form the complete framework 14, tightly containing all the modules. Or, if desired, various framework components may be partially assembled first and the modules placed within them. Where the covers 38 are employed, these must be placed over the tops of the modules prior to the completion of the framework. The longitudinal channels 26 along the bottom of the boat provide a durable bearing surface so that the boat may be dragged into the water without damage to the thin material forming the bottom of the modules.

The completed boat 10 has smooth lines for reduced fluid resistance, preferably having continuous surfaces along the sides and bottom, as described above. Thus, once the boat is in the water it performs in substantially the same manner as a conventional boat, although it provides considerably more buoyancy and safety due to its lightweight construction and independent floatation compartments. The person or persons using the boat may sit on a seat 37 or panel 40 and place their feet on the bottom surface 16 of one of the modules. By moving panels from one cover 38 to another, the seating arrangement may be changed at will.

The boat may be equipped with oars, motors, sails, or other auxiliary equipment as may be desired, preferably secured to portions of the external framework 14. One of the modules may have a pierced or open mesh bottom 42 as shown in FIGURE 4, so as to allow the flow of water through the module, thereby providing a bait or a catch compartment for fishing. Also, providing suitable additions are made to the external framework 14, some of the modules 12 could be left out, thereby leaving a gap or open space in the boat. However, a continuous assembly of adjacent modules is preferred.

The configuration of module boats constructed in accordance with the invention is by no means limited to the configuration of the module boat 10. The boat and the modules thereof may have a wide variety of configurations, such as rounded bottoms or sides, V-shaped configurations, varied width, etc. Special modules may be employed for the bow and stern sections which have completely different configurations from the other modules, so as to provide a pointed bow, etc. These special modules may be designed either to stack inside the main modules or to be separately carried. The corresponding external framework may be varied accordingly, including changing the numbers, shapes, and types of framework members. Further, it is not essential to the invention that the modules be adapted to stack, where, for example, it is desired to use modules of identical dimensions or modules containing cargo or floatation material such as foamed plastic. The modules may comprise a type of waterproof cargo container, joined together with other containers by an external framework structure to form a rapidly assembled and disassembled unitized cargo transport raft.

Numerous applications are possible for module boats constructed in accordance with the present invention. Particularly advantageous for military use is the provision of a plurality of completely separate floatation compartments, so that floatation is provided even if several modules are damaged or destroyed. Also the absence of structural connections between modules and the non-reliance upon the walls of the modules for structural strength means that damage to the walls or bottom of the boat does not affect the structural integrity of the boat and is easily repaired. Module boats in accordance with the invention may serve as floats or pontoons supporting military floating bridges or similar structures. The capability for transportability, rapid construction, and high load-bearing capacity is particularly advantageous in this application.

It is contemplated that numerous further variations and modifications within the purview of those skilled in the art can be made herein, and it is intended to cover in the appended claim all such variations and modifications as fall within the true spirit and scope of the invention.

What is claimed is:

A lightweight transportable boat comprising: a plurality of floatation modules, substantially all of said modules each comprising a lightweight thin-walled self-floating vessel adapted to fit substantially within another of said modules and having a bottom, parallel opposing vertical end walls, and opposing outwardly sloping side walls having top and bottom edges, said side walls being spaced equally for each said module and said end walls being spaced differingly for each said module, at least one of said end walls of each said module completely and evenly abutting an end wall of an adjacent module, said plurality of modules so abutting forming an elongate boat configuration having continuous and parallel longitudinal lines formed by said top and bottom edges of said side walls; a separable rigid framework means external to said group of modules and continuously enclosing and confining said modules therein, said framework means including a plurality of elongate longitudinal channel members having angularly intersecting interior surfaces, said angular surfaces of said longitudinal channel members continuously abutting only said longitudinal lines of said boat configuration, further channel members transverse said boat configuration abutting each end thereof and rigidly interconnecting said longitudinal channel members, and vertical connecting means securing said longitudinal channel members to one another, said abutting confinement of said modules within said framework means providing the sole means for the securing of said modules together into said boat configuration.

References Cited by the Examiner
UNITED STATES PATENTS

| 146,316 | 1/74 | Clark | 9—11 |
|---|---|---|---|
| 906,261 | 12/08 | Morzinski | 9—5 |
| 2,480,144 | 8/49 | Lavcock | 114—0.5 |
| 2,879,735 | 3/59 | Pointer | 114—0.5 |
| 2,919,451 | 1/60 | Long | 9—2 |
| 3,036,539 | 5/62 | Storey | 114—0.5 |

FERGUS S. MIDDLETON, *Primary Examiner.*